United States Patent
Foroozan et al.

(10) Patent No.: US 11,462,054 B2
(45) Date of Patent: Oct. 4, 2022

(54) RADAR-BASED INDOOR LOCALIZATION AND TRACKING SYSTEM

(71) Applicant: Analog Devices International Unlimited Company, Limerick (IE)

(72) Inventors: Foroohar Foroozan, Richmond Hill (CA); Wassim Rafrafi, West Toronto (CA)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 0 days.

(21) Appl. No.: 17/076,229

(22) Filed: Oct. 21, 2020

(65) Prior Publication Data

US 2021/0117659 A1 Apr. 22, 2021

Related U.S. Application Data

(60) Provisional application No. 62/923,947, filed on Oct. 21, 2019.

(51) Int. Cl.
| | |
|---|---|
| *G06K 9/00* | (2022.01) |
| *G06V 40/20* | (2022.01) |
| *G06T 7/246* | (2017.01) |
| *G06T 7/73* | (2017.01) |
| *G06T 7/13* | (2017.01) |
| *G01S 13/72* | (2006.01) |
| *G01S 13/86* | (2006.01) |

(52) U.S. Cl.
CPC ............ *G06V 40/23* (2022.01); *G01S 13/726* (2013.01); *G01S 13/867* (2013.01); *G06T 7/13* (2017.01); *G06T 7/246* (2017.01); *G06T 7/74* (2017.01); *G06T 2207/10028* (2013.01); *G06T 2207/30196* (2013.01); *G06T 2207/30232* (2013.01)

(58) Field of Classification Search
None
See application file for complete search history.

(56) References Cited

U.S. PATENT DOCUMENTS

2017/0003752 A1\* 1/2017 Ishiwata ................. G06F 3/017
2019/0285752 A1\* 9/2019 Chattopadhyay .. G06K 9/00805

OTHER PUBLICATIONS

Liu et al., "People detection and tracking using RGB-D cameras for mobile robots", International Journal of Advanced Robotic Systems 2016 (Year: 2016).*
Filipe et al., "PFBIK-tracking: particle filter with bio-inspired keypoints tracking", IEEE 2014 (Year: 2014).*

\* cited by examiner

*Primary Examiner* — Soo Jin Park
(74) *Attorney, Agent, or Firm* — Patent Capital Group

(57) ABSTRACT

Embodiments of the present disclosure describe mechanisms for a radar-based indoor localization and tracking system. One example can include monitoring unit that includes a radar source, a camera unit, and one or more processors coupled to the radar element and the camera unit. The monitoring unit is configured to generate point cloud data associated with an object; execute Point Cloud Library (PCL) preprocessing based, at least, on the point cloud data; execute Density-Based Spatial Clustering of Applications with Noise (DBSCAN) clustering; execute multi-object tracking on the object; and execute an image PCL overlay based on the point cloud data to generate real-time data associated with the object.

20 Claims, 16 Drawing Sheets

RADAR-BASED INDOOR LOCALIZATION AND TRACKING SYSTEM

CROSS-REFERENCE TO RELATED APPLICATIONS

This application non-provisional application under 35 U.S.C. § 119(e) claims the benefit of and priority from of U.S. Provisional Patent Application Ser No. 62/923,947 filed 21 Oct. 2019 titled "RADAR-BASED INDOOR LOCALIZATION AND TRACKING SYSTEM", incorporated herein by reference in its entirety.

TECHNICAL FIELD OF THE DISCLOSURE

The present disclosure generally relates to radar systems and, more particularly, to a radar-based indoor localization and tracking system.

BACKGROUND

The number of persons aged sixty (60) or above is expected to double Worldwide by 2050, rising from 962 million to 2.1 billion. In Europe, approximately 25% of the population is already over 60. This has a significant impact on the socioeconomic structure of society in terms of healthcare needs. This demographic shift to the overall population results in an increase in age-related diseases, rising healthcare costs, and a subsequent shortage of healthcare professionals.

Monitoring in-home patient physical activity and their accompanying vital signs [in an unobtrusive and continuous manner] may enable better predictions of health improvement, along with identifying deteriorating conditions. Additionally, effective monitoring may enable appropriate feedback for in-home events. Technologies should assist the elderly living on their own, but solutions should respect the privacy of the user and honor their independence should they choose to live alone and/or "age in place." Moreover, solutions should be able track certain features of the target users reliably, while offering the ability to inform others in case of need (e.g., emergencies, longer-term deterioration of health conditions, etc.). There is a desire of families and health insurers to have cost-effective alternatives to more simplistic assisted-living scenarios, hospice, and nursing homes.

Currently, there are smart homes, mobile devices, wearable sensors, smart fabrics, and assistive robotics that attempt to resolve some of the aforementioned issues. For a simple fall, there is a variety of devices available in the market [push-button alarms, wearable fall detectors that sense falls, etc.] that offer one potential pathway. However, what happens if the user is unable to physically push a button to call for help and, further, how prone are these technologies to false alarms where the fall detector fails to distinguish routine daily activities and an actual fall? Another challenge with wearable devices is that many of the users prefer to take them off while they are sleeping, taking a shower, etc. Hence, any proposed solution should be automatic with minimal manual requirements, while being accurate in its detection to avoid false alarms.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
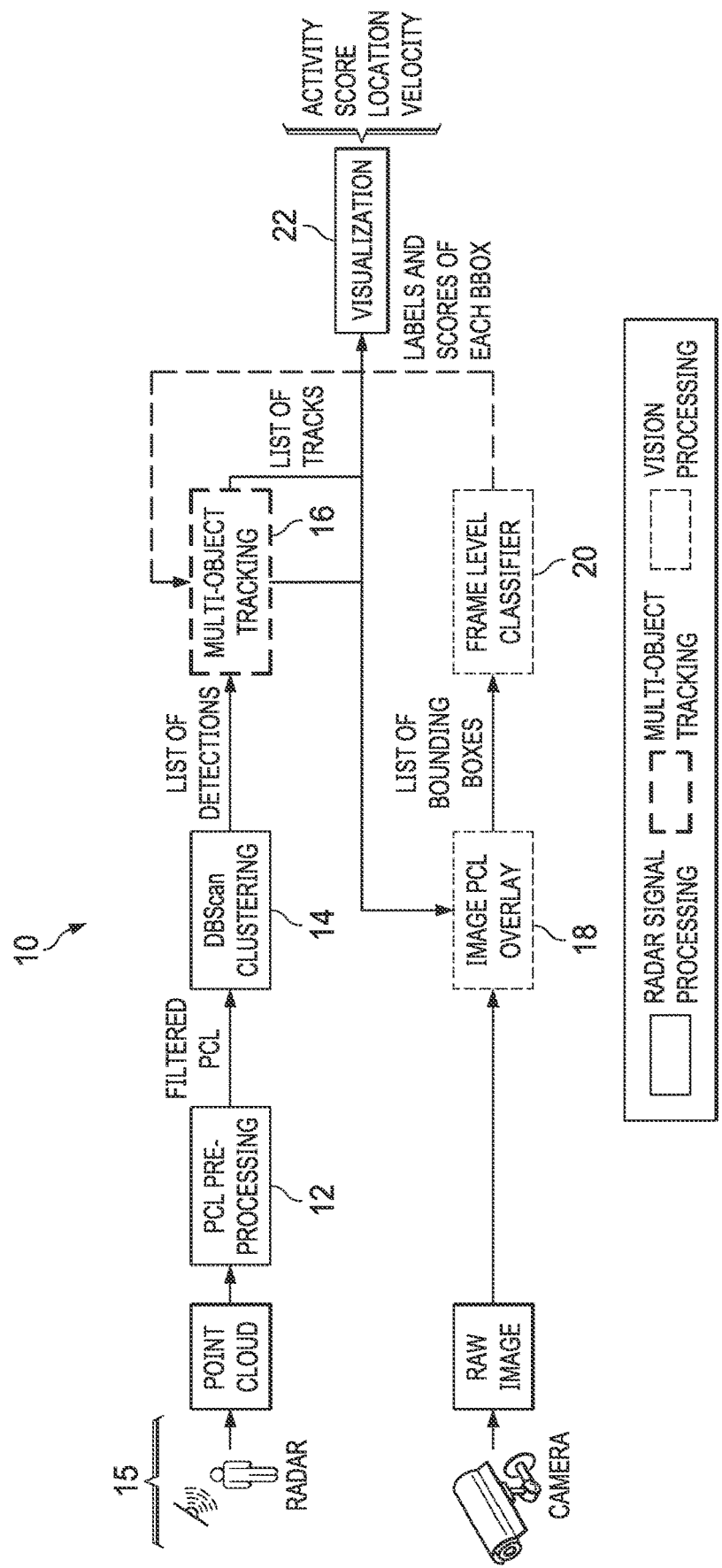
FIG. 1 is a block diagram illustrating an example system according to some embodiments of the present disclosure.

The systems, methods and devices of this disclosure each have several innovative aspects, no single one of which is solely responsible for all the desirable attributes disclosed herein. Details of one or more implementations of the subject matter described in the present disclosure are set forth in the description below and the accompanying drawings.

Embodiments of the present disclosure can offer possibilities for a contactless, unobtrusive in-home sensing device based on sensor fusion between camera and, for example, millimeter wave Multiple-Input Multiple-Output (mmWave-MIMO) radar. Such a system can be characterized in certain embodiments as radar-based assisted living (RadAL), but such a label should not be used in any way to limit the broad applications of the present disclosure. Such a system can easily operate in real-time, which is important in notifying caregivers of critical events as they occur (e.g., a fall). The architecture could also send logs of the person's gait speeds, as well as document activities to be provided to the cloud server for a trend analysis over time. The mmWave radar can be used to detect and to track a given person and provide a region proposal for a Convolutional Neural Networks (CNN) to classify the activity of a person. Both radar and vision have complementary advantages such as, for example, radar can operate without a direct line of sight. One objective in certain embodiments of the present disclosure is to combine the capabilities of these two modalities to offer a more reliable and versatile solution for activity monitoring applications [e.g., in-home, warehouse, automotive].

Computer vision algorithms can be used for foreground/background segmentation and then subsequently detect motion tracks of the most important moving parts in the image. To detect a fall, a list of features like height, width, aspect ratio of the bounding box around the moving objects can be fed into a Support Vector Machine (SVM) algorithm. A simple optical flow could be used to keep track and eliminate static objects that appear in the scene and a K-nearest neighbors algorithm can take the angle, subject ratio, and the three most recent values for ratio change speed as input for fall detection. Deep neural networks could also be used for real-time fall detection, where the architecture can simultaneously capture both the appearance and the temporal evolution of information in a video. Those images are then fed to a CNN to determine the activity of a person. Another approach could use, as input, two spatial and temporal streams. The spatial stream is an individual RGB image used to extract information about the scenes and objects depicted in the video. The temporal part would then be the motion across the multiple frames conveying the movement of the observer and the objects. Other approaches use a combination of CNN and long short-term memory (LSTM) to for activity recognition, image captioning, and video description.

In a 3D CNN that takes, as input, the whole sequence of video, this can be used to solve the activity recognition problem. A major issue with these approaches is their computational needs for running these approaches in real-time. Essentially, although major advances have been made, current approaches still cannot deal with the complexities of real-world scenarios. Additionally, such systems uniformly train and test their classifiers on the same people in the same environments and cannot generalize to new people or new environments. To avoid those issues, teachings of the present disclosure can localize a user with RF-based indoor localization. Among the benefits of using radar in assisted living lie in its contactless nature, versatility, and privacy preservation. For example, in one possible implementation, the RadAL solution (e.g., running on an Nvidia Jetson Nano processor) can use radar point cloud fora moving target region proposal and target tracking, while employing a CNN for activity classification.

As will be appreciated by one skilled in the art, aspects of the present disclosure, in particular aspects of radar-based monitoring to achieve real-time monitoring as described herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing monitoring units and/or their cameras, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings, where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. Various aspects of the illustrative embodiments are described using terms commonly employed by those skilled in the art to convey the substance of their work to others skilled in the art. The terms "substantially," "approximately," "about," etc., may be used to generally refer to being within +/−20% of a target value based on the context of a particular value as described herein or as known in the art. Other features and advantages of the disclosure will be apparent from the following description and the claims.

Example RadAL System

FIG. 1 is a block diagram illustrating an example system 10 according to some embodiments of the present disclosure. As shown in FIG. 1, system 10 may offer a RadAL software architecture that includes (a) radar signal processing; (b) multi-object tracking; and (c) vision processing. In this non-limiting example implementation, FIG. 1 includes a monitoring unit 15 that includes a radar source and a camera unit. The radar source is coupled to a point cloud, which communicates to a Point Cloud Library (PCL) pre-processing unit 12. Also provided in this illustration is a Density-Based Spatial Clustering of Applications with Noise (DBSCAN) clustering unit 14, and a multi-object tracking unit 16. From the camera, raw image data can be sent to an image PCL overlay 18 that is coupled to a frame level classifier 20. Both frame level classifier 20 and multi-object tracking unit 16 can be coupled to a visualization unit 22.

For the radar-camera sensor fusion aspect of certain embodiments of the present disclosure, vision-based solutions are widely suggested for activity recognition in many of the environments and applications discussed herein. Camera units can provide rich information about the scene and deep learning object detection and classification can also be effectively deployed. However, cameras still several limitations such as sensitivity to light conditions, poor depth estimation, and potential occlusion problems. Also, they usually require a high computational power to achieve a high detection/classification rate. Radar, on the other hand, can provide a solid depth estimation and radar can operate in extreme conditions. Still, simple radar is not a panacea, as it is not able to differentiate objects based on the scene texture.

One example implementation of the present disclosure includes RadAL, a sensor fusion system, that combines the strength of both camera and radar as shown in FIG. 1. One aspect of the idea is to overlay the radar point cloud on top of the image using a camera radar coordinate alignment and, further, to use the radar point cloud as a region proposal for vision-based activity classification. The following sections explain details associated with a number of the blocks of the algorithm depicted in FIG. 1. All such blocks can readily be implemented as hardware, software, algorithms, and/or circuitry of any kind.

For the RadAL algorithm aspect of the present disclosure, the RadAL algorithm can include three main blocks. The first block is a radar signal processing that takes [as input] a point cloud and outputs a list of detected elements associated information such as 3D location, velocity, and amplitude of reflection. The second block is the multi-object tracking, which is a data association algorithm where the aim is to associate radar detections from the previous and the current frame in real-time. Finally, the vision processing algorithm that conducts image processing operations (such as image rectification, radar data overlay) and outputs a list of bounding boxes associated with a label and a score of the activity performed by the target.

Specific to radar signal processing, radar data are usually noisy: mainly due to the multi-path effect. Therefore, RadAL deals with two types of challenges (illustrated in more detail in FIG. 2A). The first, the multi-path effect due to the transmitted signal being reflected off other objects in the scene such as walls and furniture. For the second challenge, the reflections caused by the signal first reflecting off the target then reflecting off other objects in the scene.

To overcome these challenges, system 10 can leverage the fact that the distance to the transmitter device for all the static objects does not change over time, therefore, their Doppler frequency stays constant over time. This metric helps in eliminating static reflection and then system 10 deals only with reflections from moving targets. In addition, two types of filters can be applied to reduce the effect of noise and improve the tracking accuracy. Specifically, by limiting the field to a certain region of interest specified by the user, system 10 can use a passthrough filter and apply an outlier rejection algorithm to eliminate noisy measurements using a statistical outlier removal filter.

Figure 2A:
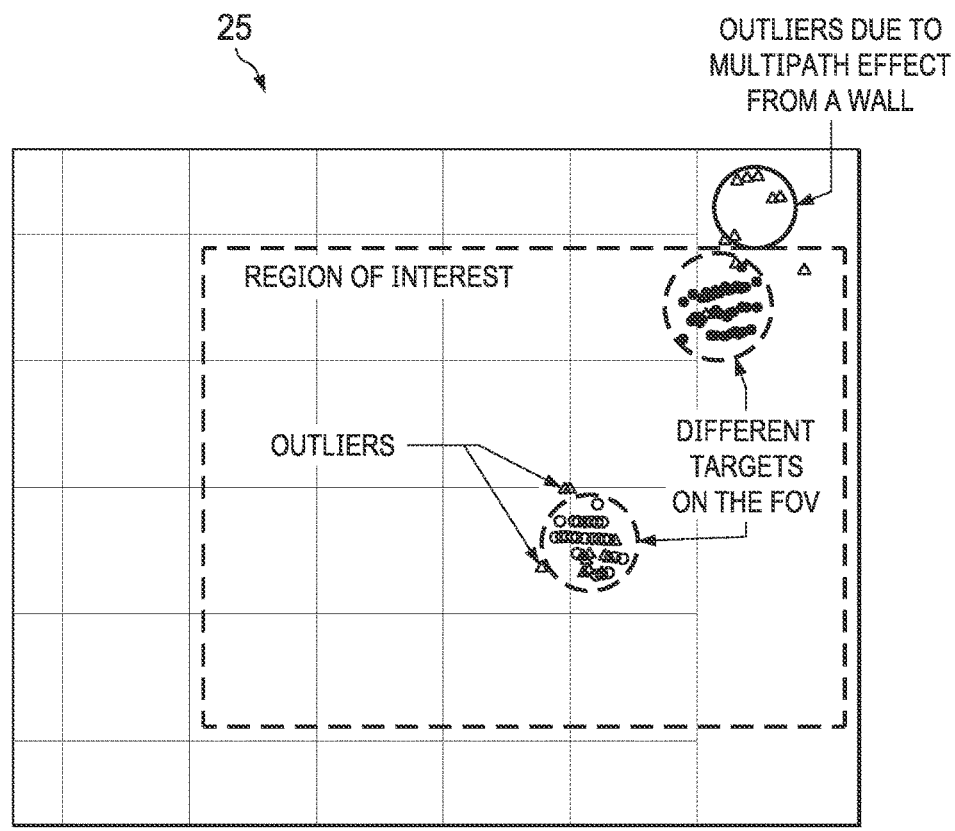
FIG. 2A is a simplified graphical illustration of multipath effects: radar point clouds inside and outside of a region of interest according to some embodiments of the present disclosure

FIG. 2A is a simplified graphical illustration 25 of multipath effects: radar point clouds inside and outside of the region of interest. More specifically, this illustrates sensor fusion algorithm-PCL filtering. For PCL pre-processing (filtering), the RadAL of system 10 resolves the multipath problems identified previously (i.e., a transmitted signal being reflected off walls and furniture, others are caused by the signal first reflected off the human body then reflected off other static objects within the field of view (FOV)). The RadAL algorithm described herein can leverage common knowledge about human motion to mitigate the effect of noise and improve its tracking accuracy. Specifically, the RadAL algorithm can achieve this by performing the following optimizations: passthrough filter (define a region of interest) and outlier rejection, which estimates unnatural human motion over a short period of time. The architecture can implement outlier rejection, where system 10 rejects impractical jumps in distance estimates that correspond to unnatural human motion over an unusually short period of time.

If the human-monitoring case is scrutinized further, in radar scenarios, not all body parts reflect the signal back to the receiver sensors. In general, a consecutive radar point cloud tends to expose different body parts. System 10 can address this issue by stitching multiple point clouds [in time] together to maximize the convergence of the target body parts. Hence, consecutive radar point clouds expose different body parts and diverse perspectives of the same body part. For instance, as a person walks within the FOV, the lower body parts may reflect the signal but not the upper body, while at other times, it could be the opposite, or a combination of both upper and lower body parts.

In certain example scenarios, system 10 may be configured to stitch multiple point clouds together to maximize the converge of the target body parts (for example, using 10 stitched point clouds).

Figure 2B:
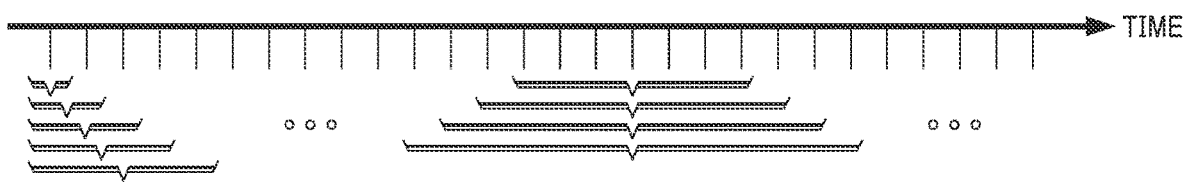
FIG. 2B illustrates stitching point clouds in time for body moving parts.

The graphical representation of FIG. 2B illustrates stitching point clouds in time for body moving parts.

In one potential scenario, the final step in the radar signal processing pipeline could be the point cloud clustering. In one example embodiment, the architecture of the present disclosure can use a DBSCAN algorithm to calculate the centroid of each cluster, to estimate the boundaries of the target, and to send the information to the multi-object tracking block.

After applying the outliers removal filters and augmenting the detected point cloud, embodiments of the present disclosure may pass the filtered point cloud to the clustering algorithm to extract the centroids of the targets.

$$\text{Filtered point cloud} = [[x_1, y_1, z_1],$$
$$[x_2, y_2, z_2],$$
$$\vdots$$
$$[x_n, y_n, z_n]]$$

For multi-object tracking, once a target has been detected, then it can be tracked along its trajectory. Many techniques can be engaged to solve the tracking problem such as employing a particle filter, a Kalman filter, a mean-shift tracking, etc. In the following descriptions, the inter-frame displacements model of the tracking, the data association algorithm, and the metric used for the creation and deletion of the tracked targets are further explained.

For a target motion model, the inter-frame displacements of each target are approximated by a constant velocity model. The state vector for each target can be described by the following vector:

$$y=[x,y,z,\dot{x},\dot{y},\dot{z}]^T$$

where x, y and z represent the 3D location of the target and $\dot{x}$, $\dot{y}$ and $\dot{z}$ describes the velocity components of the target.

The state vector can be updated in an iterative manner using a Kalman Filter, for example. The algorithm can work in two-phases: 1) the prediction phase in which the current state vector is projected forward using a constant velocity model and 2) the measurement update phase, which occurs when a new detection is observed and is responsible for adjusting the projected estimate by an actual measurement.

For data association, in an assignment scenario, the goal may be to determine the best possible assignment of detection to an existing target location. One plausible solution to this problem may be provided by using a Hungarian algorithm. The algorithm may involve a set of detections, a set of trackers, and a set of ratings indicating how close the detection is to the existing targets location. The ratings can be computed by measuring the distance between detection and the predicted location of all existing targets.

For the trackers manager, over time many targets may be entering or leaving the field of view. Therefore, managing the creation and deletion of the targets tracks may be needed to prevent an unbounded growth in the number of instances. For the creation of the targets track, the architecture can consider any detection in which the closest distance to an existing target location is higher than a certain threshold. Targets tracks deletion can be based to the activity classification results. If the target is labeled as background (high confidence), the track may be terminated.

For vision processing, the RadAL classifier architecture may be related to regions with CNN features [(R-CNN) detection framework]. Embodiments described herein may include two stages in this regard. First, around 2000 proposals may be extracted using the selective search algorithm and then proposed for the second stage. Each output of the region proposal algorithm may be passed through a CNN for feature extraction. Those features can be then fed into an SVM to classify whether the bounding box contains an object or not. Additionally, those features are also passed through regression layers in order to predict the four offset values of the bounding box. One main disadvantage of R-CNN is that the algorithm cannot be implemented in real-time due the high number of the region proposals, where each image takes around 47 seconds per image. Unlike R-CNN, RadAL may not require a region proposal algorithm as the radar point cloud overlaid on top of the image gives a highly accurate indication of where the target might be. Embodiments may be able to run the application in real-time, as the architecture reduces the number of proposals from 2000 to only the actual number of the targets in the field of view.

As it pertains to a neural net architecture, in the recent years, there have been many designs for object detection (e.g., MobileNets, VGG-16, etc.). Embodiments of the present disclosure may use a MobileNets model pre-trained on ImageNet dataset, which can be sufficient for object detection (having more than 14 million hand-annotated images). The selection of such a design choice can be motivated by the speed of the model and the high accuracy achieved in other object detection applications.

For the training process, to overcome the limited number of the publicly available fall datasets, embodiments may rely on a dataset built in a realistic setting and in several home environments. To build a generic fall detector, embodiments may be based on an application of transfer learning on a MobileNet4 model originally trained on ImageNet.

Figure 3:
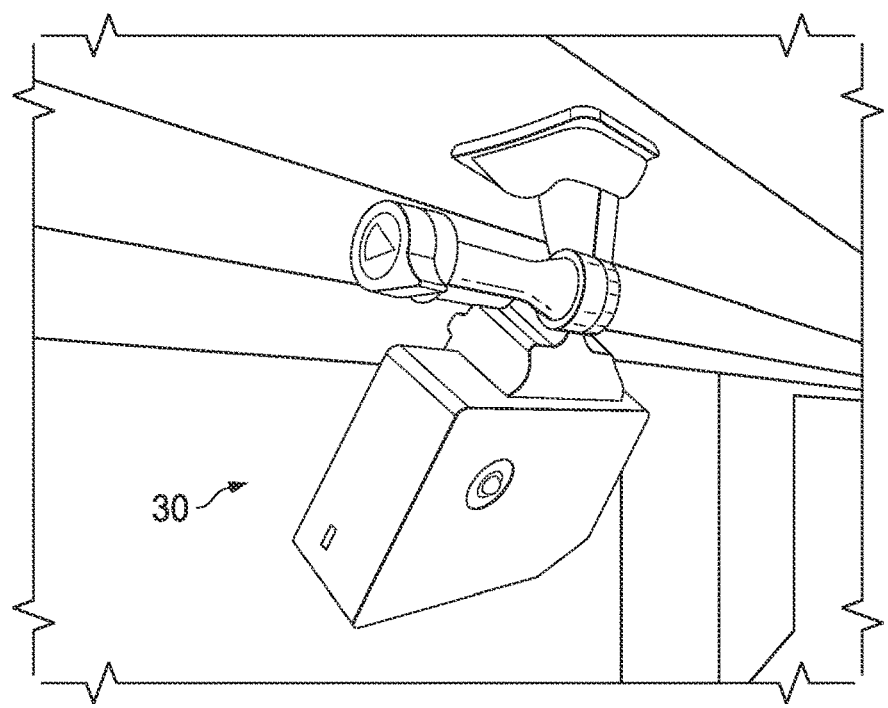
FIG. 3 is a simplified schematic diagram of an example implementation of the present disclosure.

FIG. 3 is a simplified schematic diagram of an example implementation of a monitoring unit 30 of the present disclosure. In this instance, a single RGB Fisheye Camera is being deployed in conjunction with edge computing (e.g., a low-cost Raspberry Pi3 processor). In one example, there is no image/video being streamed to the cloud server, where an algorithm is run in real-time and provided on an embedded device. Such a unit can easily implement embedded algorithms and a software (SW) platform (node SW). Cloud Services can be readily achieved in any suitable manner and involve any network setup (e.g., node to cloud/cloud to caregiver/cloud to node communications). Note the complete packaging option being provided in such an implementation of monitoring unit 30. Any appropriate software, modules, hardware, etc. can be provisioned within monitoring unit 30 to achieve the teachings of the present disclosure, as described herein.

Figure 4:
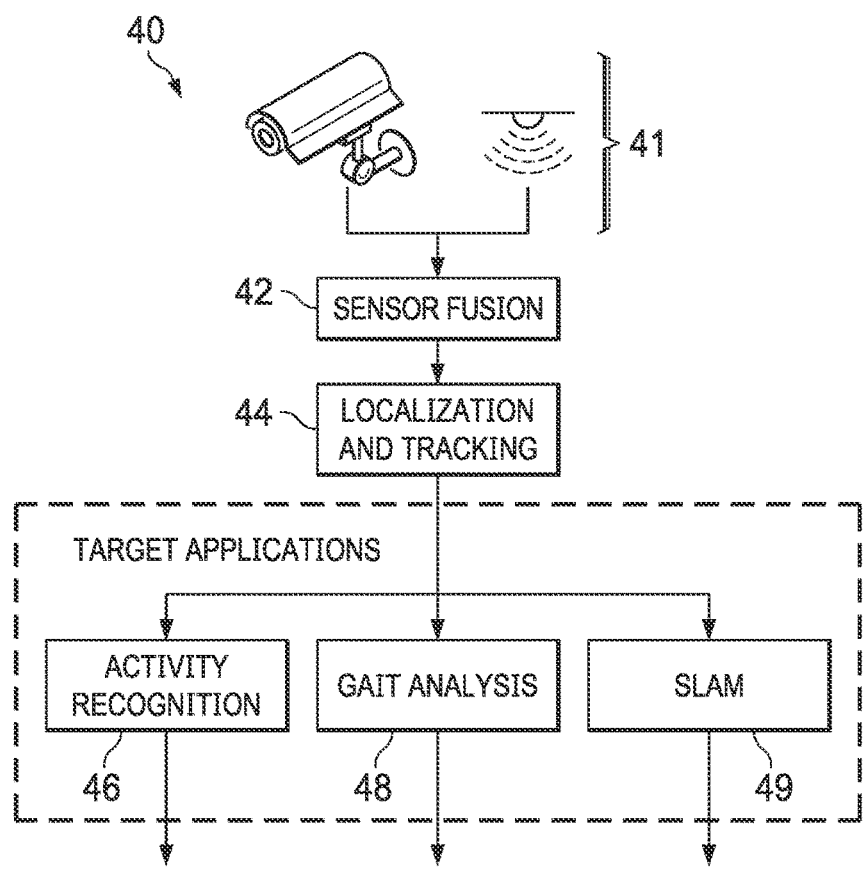
FIG. 4 is a simplified block diagram of another example implementation of the present disclosure.

FIG. 4 is a simplified block diagram of an example implementation 40 of the present disclosure. FIG. 4 includes a monitoring unit 41 (similar, but not exactly, to that of FIG. 1 with reference to monitoring unit 15). Monitoring unit 41 includes a radar source and a camera unit, along with several software modules illustrated below these. Any such modules can be incorporated into either of these or provisioned in any suitable manner. Also provided in this illustration of a RadAL architecture is a sensor fusion element 42, a localization and tracking element 44, and a set of target applications, which further include an activity recognition element 46, a gait analysis element 48, and a simultaneous localization and mapping (SLAM) element 49. SLAM reflects the computational problem of constructing or updating a map of an unknown environment, while simultaneously keeping track of an agent's (i.e., a target) location within it. In a warehouse environment, for example, the target could be a conveyor belt, or robotics to be monitored. In an automotive environment, the target could involve individual components of the automobile, or be specific to self-driving applications.

Figure 5:
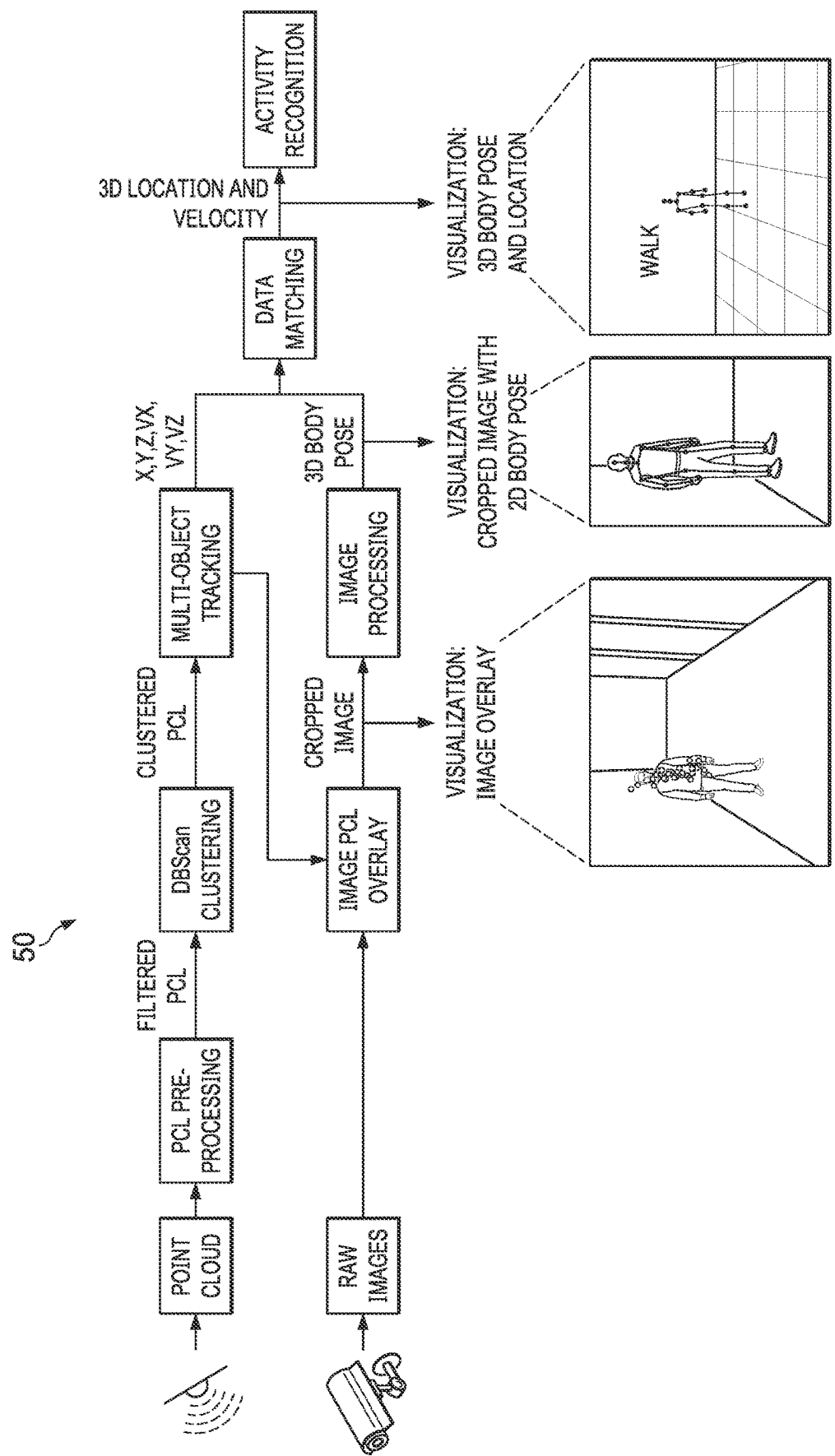
FIG. 5 is a simplified block diagram illustrating one example sensor fusion software pipeline according to some embodiments of the present disclosure.

FIG. 5 is a simplified block diagram illustrating one example sensor fusion software pipeline 50. Note that this illustration can be described in general terms in conjunction with the implementation of FIG. 1. In this case, there is a visualization image overlay between the image PCL overlay and the image processing. In addition, there is provided a visualization of a cropped image with a 2D body pose, which is related to the 3D body pose as shown by the arrow. Between the data matching component and the activity recognition is a visualization 3D body pose and a location resultant.

Figure 6:
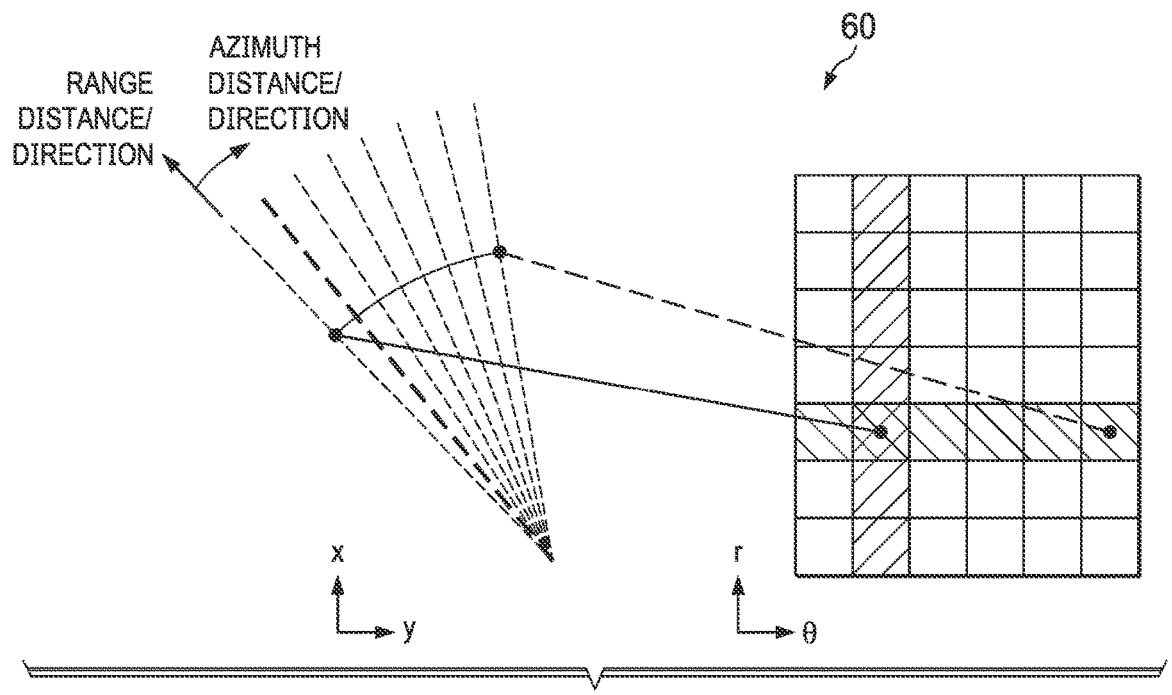
FIG. 6 is a simplified graphical diagram illustrating one example data output according to some embodiments of the present disclosure.

FIG. 6 is a simplified graphical diagram illustrating one example data output 60 of a sensor. In one example, the data output of the sensor (right) in r- and the θ-grid and data transformation in common Cartesian (x-y) coordinates obtained from trigonometric functions. More specifically, FIG. 6 illustrates a radar point cloud implementation such that for the 2D-scenario, the observation of a target in a radar signal may be determined by the following two factors: An azimuth angle (θ); and distance to the sensor (r). A transformation from Polar coordinates (r,θ) to Cartesian coordinates (x,y) may be calculated using trigonometric functions: $x=r\cos(\theta)$; and $y=r\cos(\theta)$.

Both variables may have a fixed sampling resolution, with r in units of length and θ in units of angle. The result is a NON-EQUIDISTANT sampling in Cartesian coordinates resulting from the trigonometric calculation of the (x, y) values. As a result, the minimal azimuth distance between two points increases with range.

The output of the radar point cloud may be a list including the Cartesian coordinates, the amplitude of the reflection, and the velocity. For example:

$$\text{Radar point cloud} = [[x_1, y_1, z_1, amplitude_1, velocity_1],$$
$$[x_2, y_2, z_2, amplitude_2, velocity_2],$$
$$\vdots$$
$$[x_n, y_n, z_n, amplitude_n, velocity_n]]$$

Figure 7:
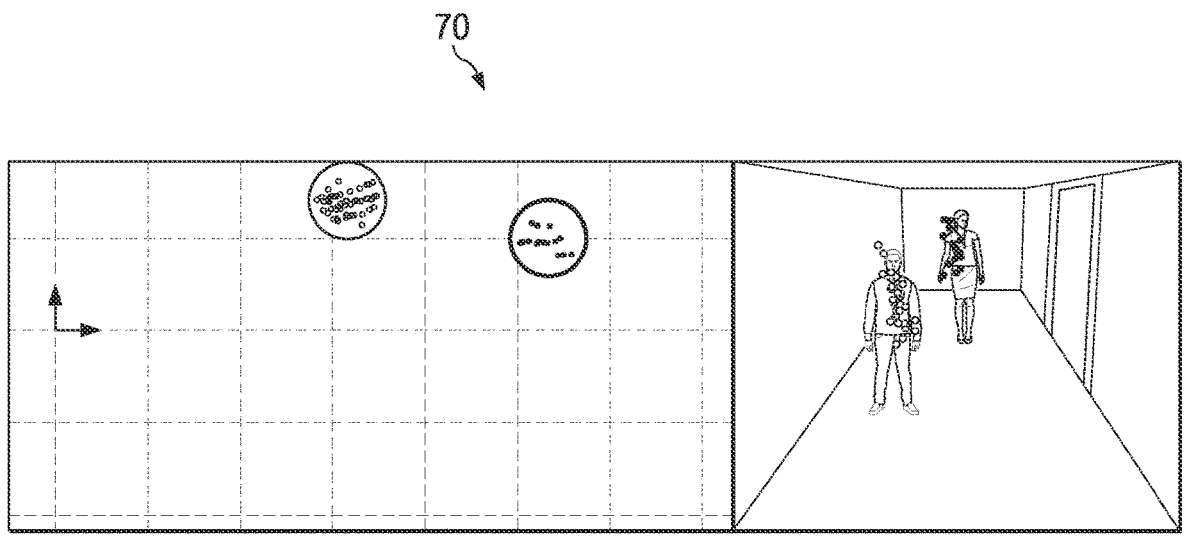
FIG. 7 is a simplified schematic diagram of a Density-Based Spatial Clustering of Applications with Noise (DB-SCAN) example implementation according to some of the teachings of the present disclosure.

FIG. 7 is a simplified schematic diagram of a DBSCAN example implementation 70 according to some of the teachings of the present disclosure. After applying DBSCAN, the algorithm may calculate the centroid of each cluster and estimate the boundaries of the target. The output of this block may follow this shape:

$$\text{List of detections} = [[x_1, y_1, z_1, x_{min}, x_{max}, y_{min}, y_{max}, z_{min}, z_{max}],$$
$$[x_2, y_2, z_2, x_{min}, x_{max}, y_{min}, y_{max}, z_{min}, z_{max}],$$
$$\vdots$$
$$[x_n, y_n, z_n, x_{min}, x_{max}, y_{min}, y_{max}, z_{min}, z_{max}]]$$

Figure 13A:
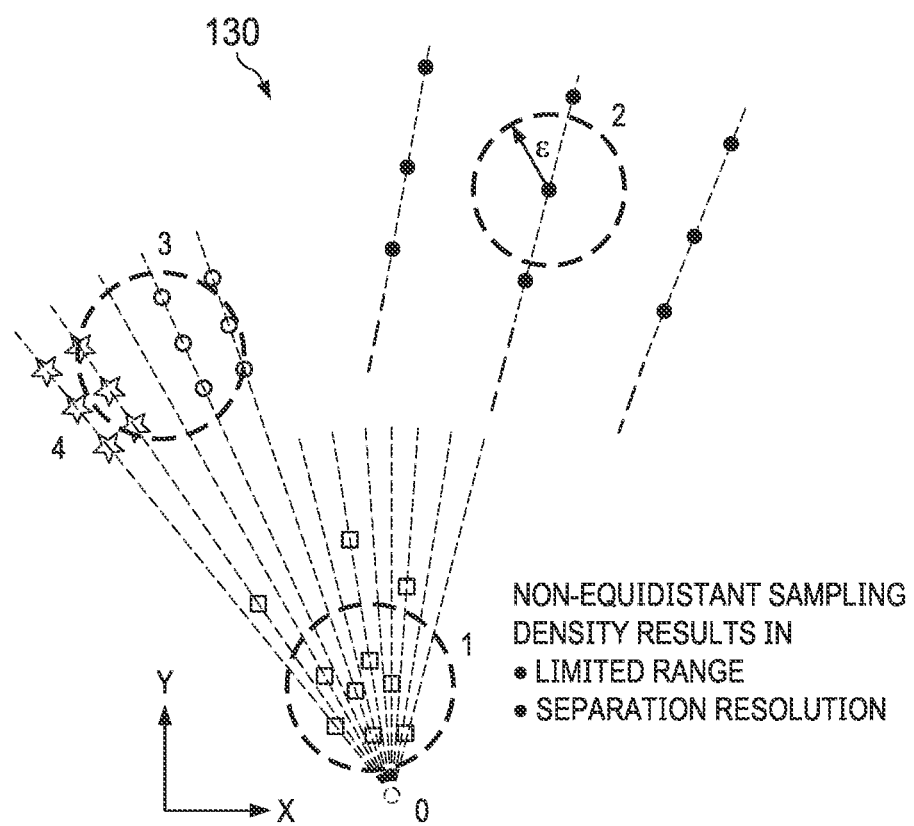
FIG. 13A is a simplified graphical diagram of a DBSCAN algorithm according to some of the teachings of the present disclosure.
Figure 13B:
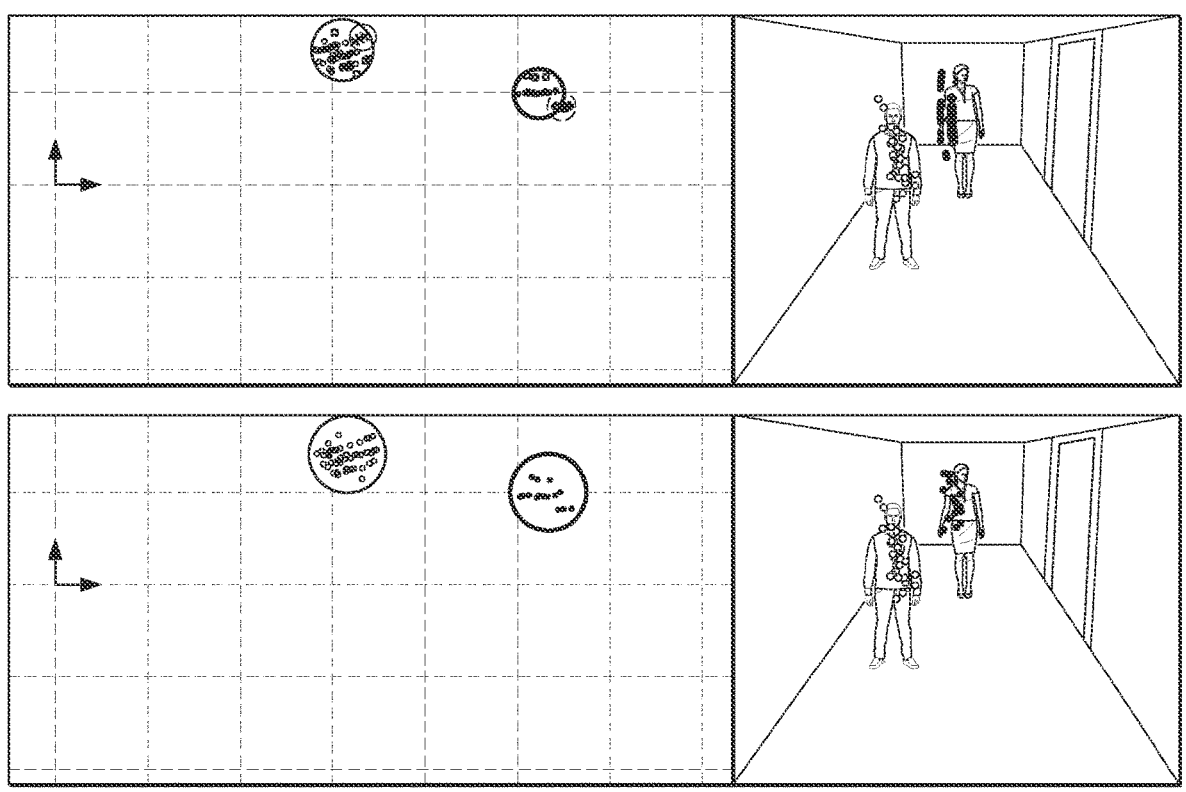
FIG. 13B is a simplified schematic diagram of a DBSCAN example implementation according to some of the teachings of the present disclosure.

Note that FIGS. 13A-B can also be referenced in this discussion, as they too relate to this aspect of the examples provided herein. More specifically, FIG. 13A is a simplified graphical diagram of a DBSCAN algorithm 130, while FIG. 13B is a simplified schematic diagram of a DBSCAN example implementation 135 according to some of the teachings of the present disclosure. The DBSCAN algorithm for radar data can use a fixed density threshold for the creation of a cluster, where each observation is examined if there are at least k observations within a radial search radius ε. Non-equidistant sampling density results in a limited range and a separation resolution.

This example of FIG. 13A shows the effects of the original DBSCAN algorithm on two close objects, one object far away and clutter. For the example of FIG. 13B, this offers a variant implementation of the DBSCAN algorithm.

A possible alternative embodiment provides for the introduction of spatial-variable parameters for both search radius and number of observations: ε(x,y) and k(x,y). Some of the advantages of this method include a simple comparison in both directions to determine observations inside the search area. Within this implementation, there is an original DBSCAN with constant ε and k, along with a DBSCAN with variant ε and k.

For a non-equidistance example, the minimal azimuth distance between two points increases with range. For a limited range, objects that are far away from the sensor are not necessarily clustered because the search radius ε is smaller than the sampling resolution or the number of possible observations is smaller than the amount of required observations (k). For separation resolution, this reflects the ability to separate two objects in the azimuth direction and this varies significantly with the range. Close to the sensor, the search radius includes many azimuth cells, so that a separation of two closely spaced objects is not possible.

Figure 8:
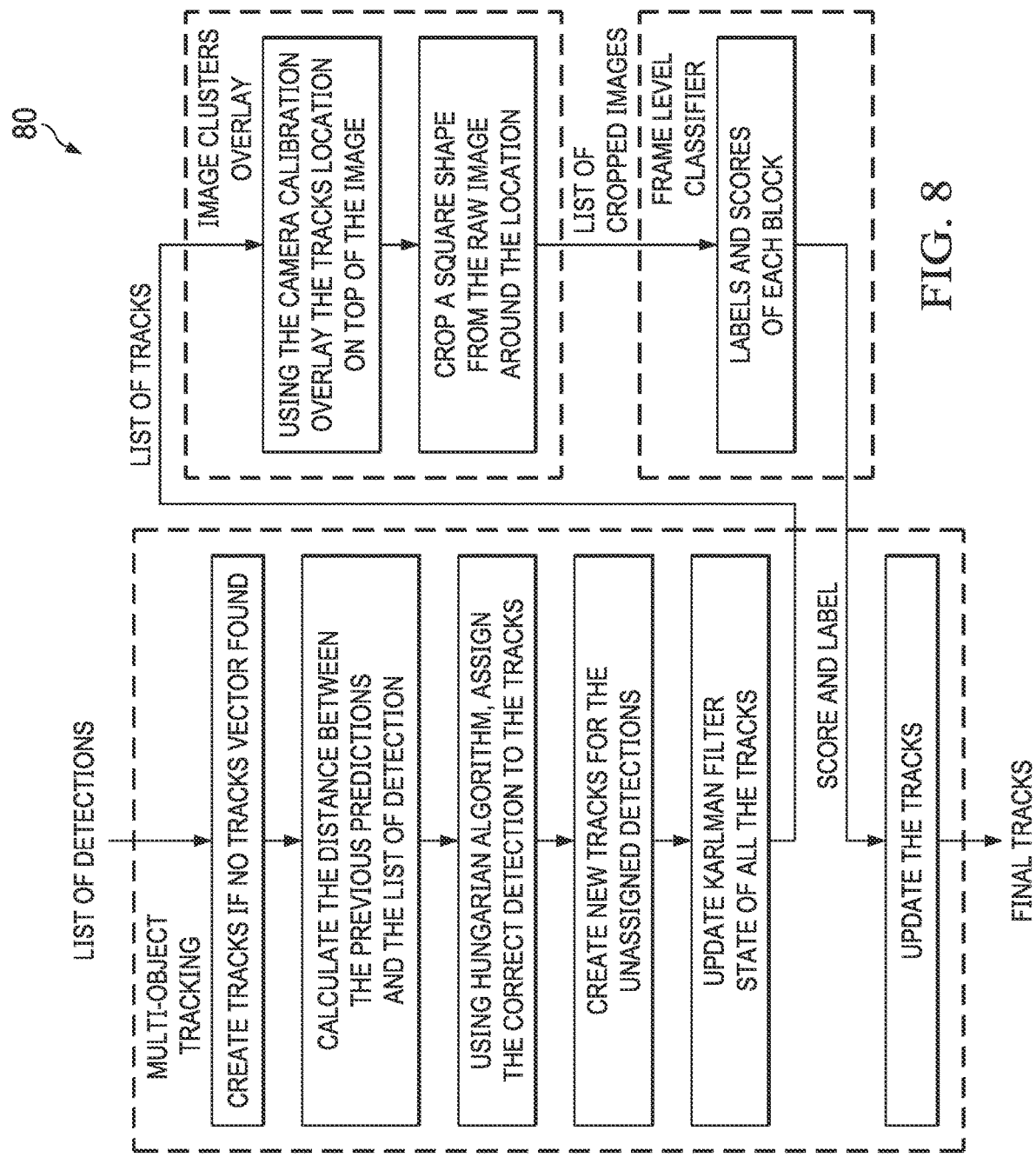
FIG. 8 is a simplified flow diagram illustrating one set of example operations associated with the present disclosure.

FIG. 8 is a simplified flow diagram 80 illustrating one set of example operations associated with the present disclosure. This illustration offers one, of the many, potential workflows of the overall algorithm. In this particular flow for multi-object tracking, the multi-object tracking algorithm may take [as input] a list of detections and work with two other blocks (image clusters overlay and frame level classifier) in order to build the final decision.

In operation, first, when the multi-object tracking algorithm receives a list of detections, it starts by updating the target location of all the tracks. Second, the architecture sends the list of tracks found to the image clusters overlay algorithm to extract the portion of the image associated with the location. Third, the cropped images are sent to the CNN to check which kind of activity the target is performing. Fourth, the CNN output is sent back to the multi-object tracking algorithm to add the score and the label to the associated track. Also, there are other verifications that can be performed during this step. If the CNN returns background as a label with a score above a certain threshold, the track may be terminated.

Embodiments may also average the track score over 10 frames. The final output of the multi-object tracking may have the following format:

$$\text{List of targets} = [[label_1, score_1, u_1, v_1, left_1, right_1, top_1, bot_1, x_1, y_1, z_1, velocity_1],$$
$$[label_2, score_2, u_2, v_2, left_2, right_2, top_2, bot_2, x_2, y_2, z_2, velocity_2],$$
$$\vdots$$
$$[label_n, score_n, u_n, v_n, left_n, right_n, top_n, bot_n, x_n, y_n, z_n, velocity_n]]$$

Figure 9:
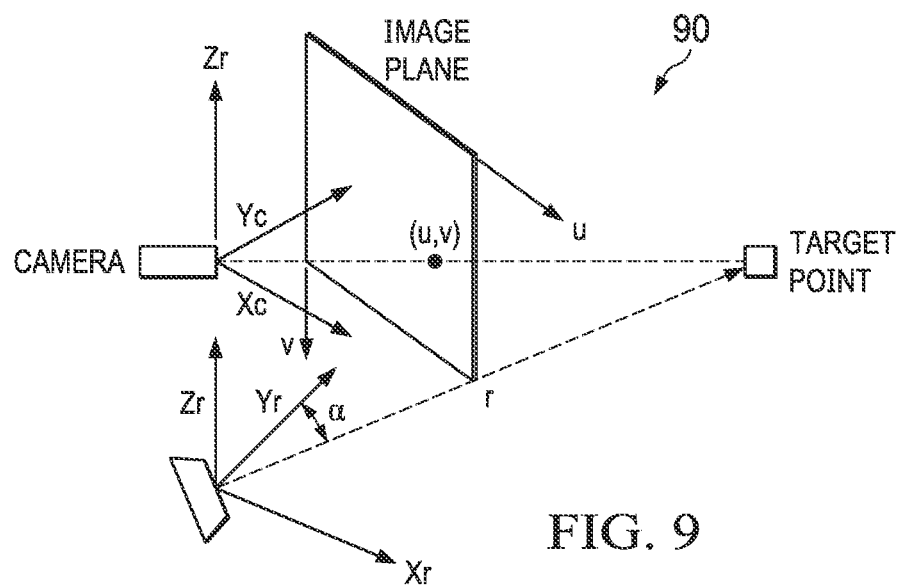
FIG. 9 is a simplified graphical diagram of an image cluster overlay according to some embodiments of the present disclosure.
Figure 10:
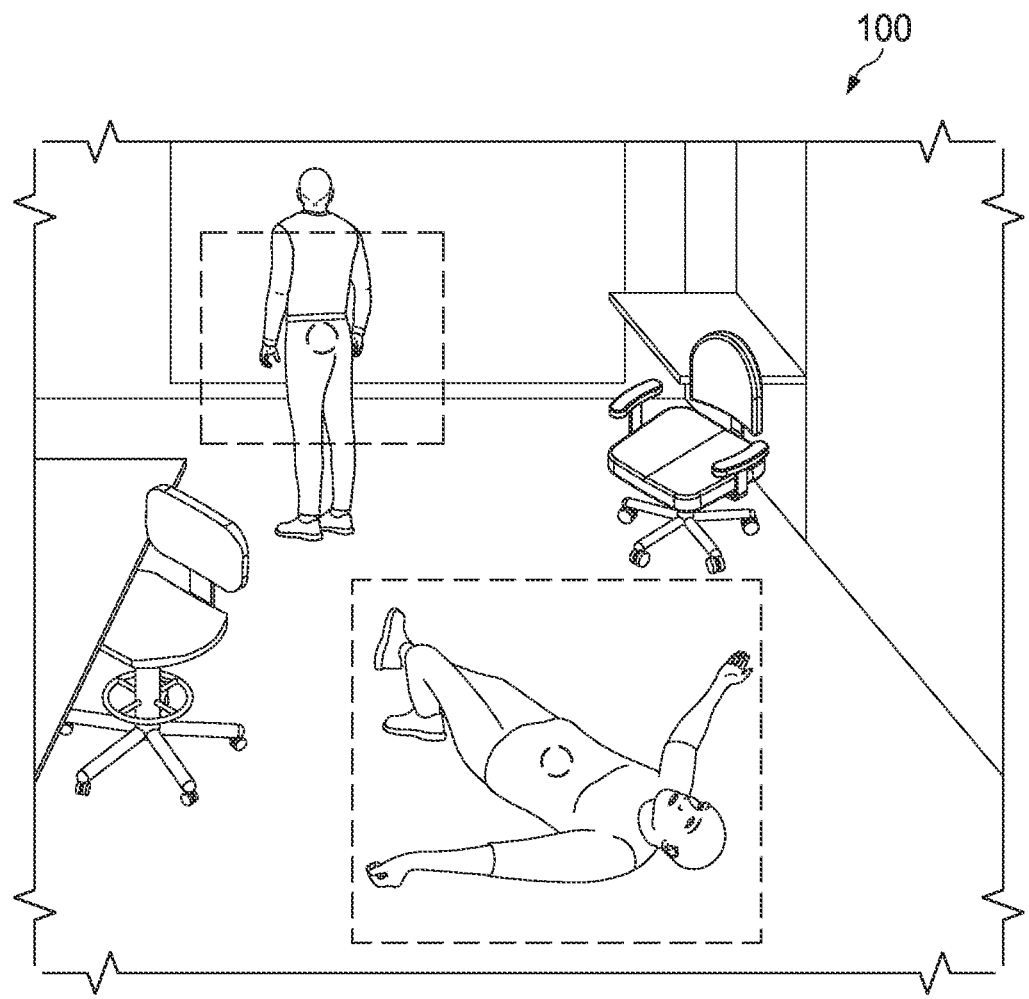
FIG. 10 is a simplified schematic diagram showing bounding boxes created by overlaying a 3D coordinate of a target on top of the image according to some embodiments of the present disclosure.

Where:
  label, score: the output of the CNN
  $u_i$, $v_i$: The coordinates of the centroid of the bounding box in the image
  $left_i$, $right_i$, $top_i$, $bot_i$: Bounding box information
  $x_i$, $y_i$, $z_i$: The 3D location of the target.
  $velocity_i$: The velocity of the target FIG. 9 is a simplified graphical diagram 90 of an image cluster overlay. FIG. 10 is a simplified schematic diagram 100 showing the bounding boxes created by overlaying the 3D coordinate of the target on top of the image. FIGS. 9 and 10 are described together for purposes of clarity and explanation. For the illustration of FIG. 9, an offline calibration can be executed one time during device manufacturing. Additionally, there can be provisioning for a bounding box with width/height dynamic scaling.

For the image clusters overlay, to use the measurements from different kinds of sensors at various positions, the measurements should be transformed from their own coordinate system into some common coordinate system.

Embodiments may include one or more coordinate systems such as: a camera coordinate represented by the standard pinhole model; and a radar coordinate where the radar system provides range and orientation in both angles azimuth and elevation. This information can be converted into a 3D point cloud to describe the target point. The coordinate system could also be the World coordinate system used in a suitable calibration procedure.

As discussed above, and with respect to the calibration issue, the challenge in using radar to locate humans is that not all body parts reflect the signal back to the sensor. Hence, one activity of the architecture discussed herein is to overlay the Cartesian point cloud on top of the image using an offline calibration. (This calibration would probably only be performed during the sensor manufacturing.) After the point cloud overlay, a bounding box can be estimated as an initial guess based on the point could boundaries.

To ensure that all the body parts are present within the estimated bounding box, another metric can be implemented. This can include scaling the width and the height of the bounding box. This scale factor can be dynamic, a function of the target location, to avoid a small or a big bounding box when the target is nearby the sensor versus far away from the sensor.

Figure 11:
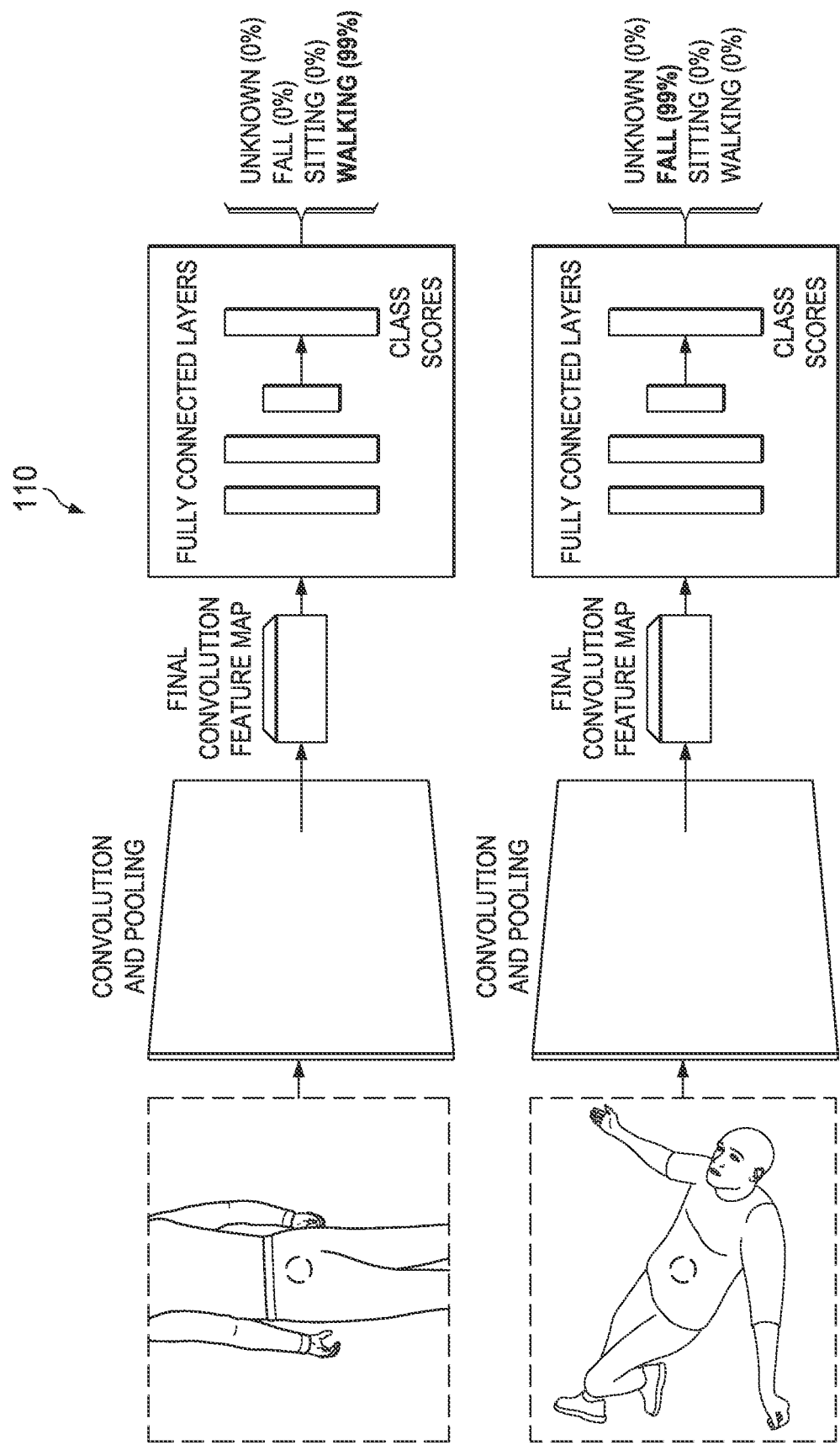
FIG. 11 is a simplified schematic diagram illustrating an activity recognition classifier according to some embodiments of the present disclosure.

FIG. 11 is a simplified schematic diagram 110 illustrating an activity recognition CNN classifier. In this example implementation, convolution and pooling layers can be fed into a final cony feature map that yields fully connected layers and class scores, as illustrated. The two examples provided by FIG. 11 illustrate FALL and WALKING percentages, as is depicted.

Figure 12:
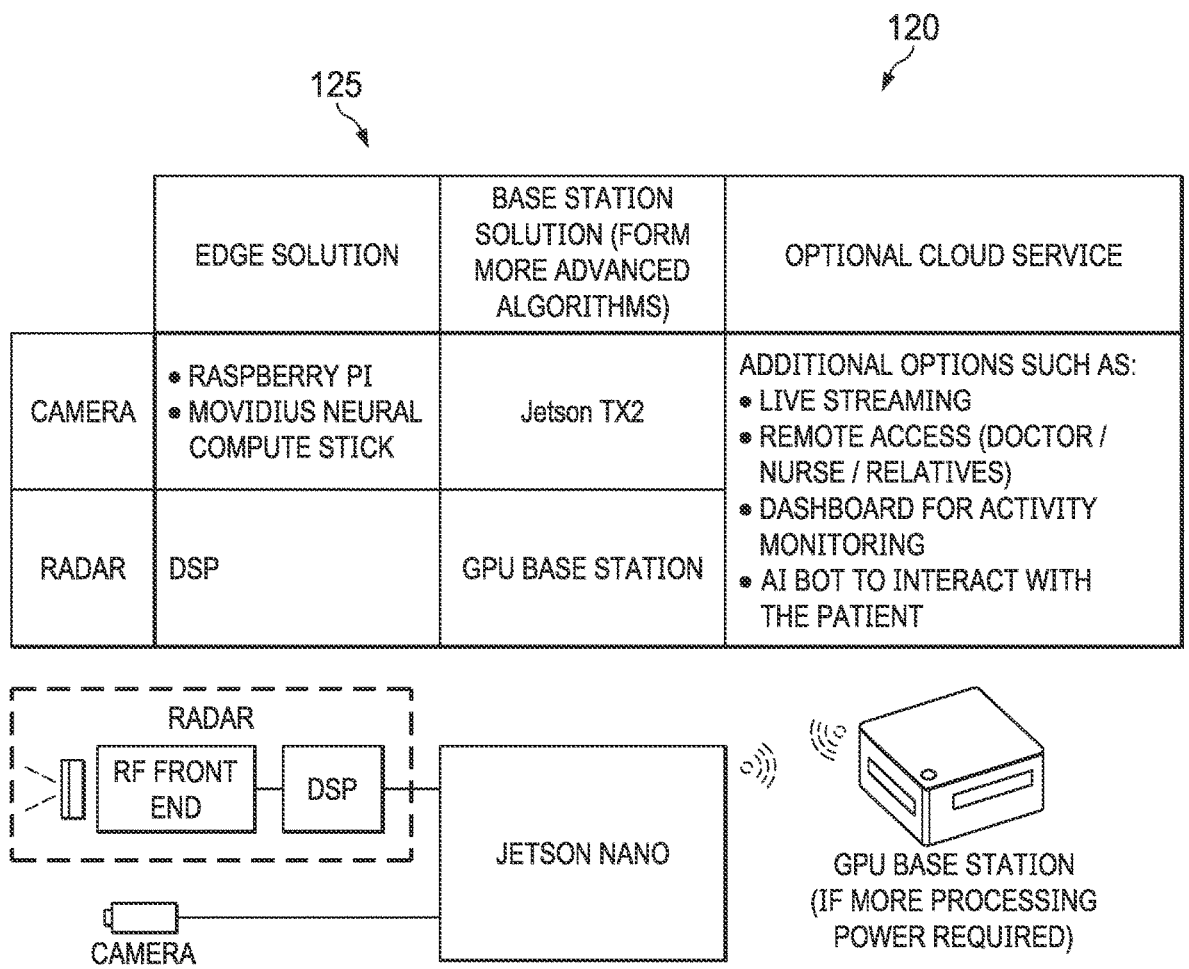
FIG. 12 is a simplified block diagram illustrating one implementation of the present disclosure.

FIG. 12 is a simplified block diagram illustrating one implementation 120 of the present disclosure. In this example, several possible configuration choices 125 have been offered by way of example only and should not be used in any way to limit the broad teachings of the present disclosure. The radar, for example, can be implemented through an RF front end and a digital signal processor (DSP), while the camera can be coupled to a Jetson Nano, to a Raspberry Pi, and/or to a MOVIDIUS unit. A graphics processing unit (GPU) base station is also provisioned in this one non-limiting example implementation.

Figure 14:
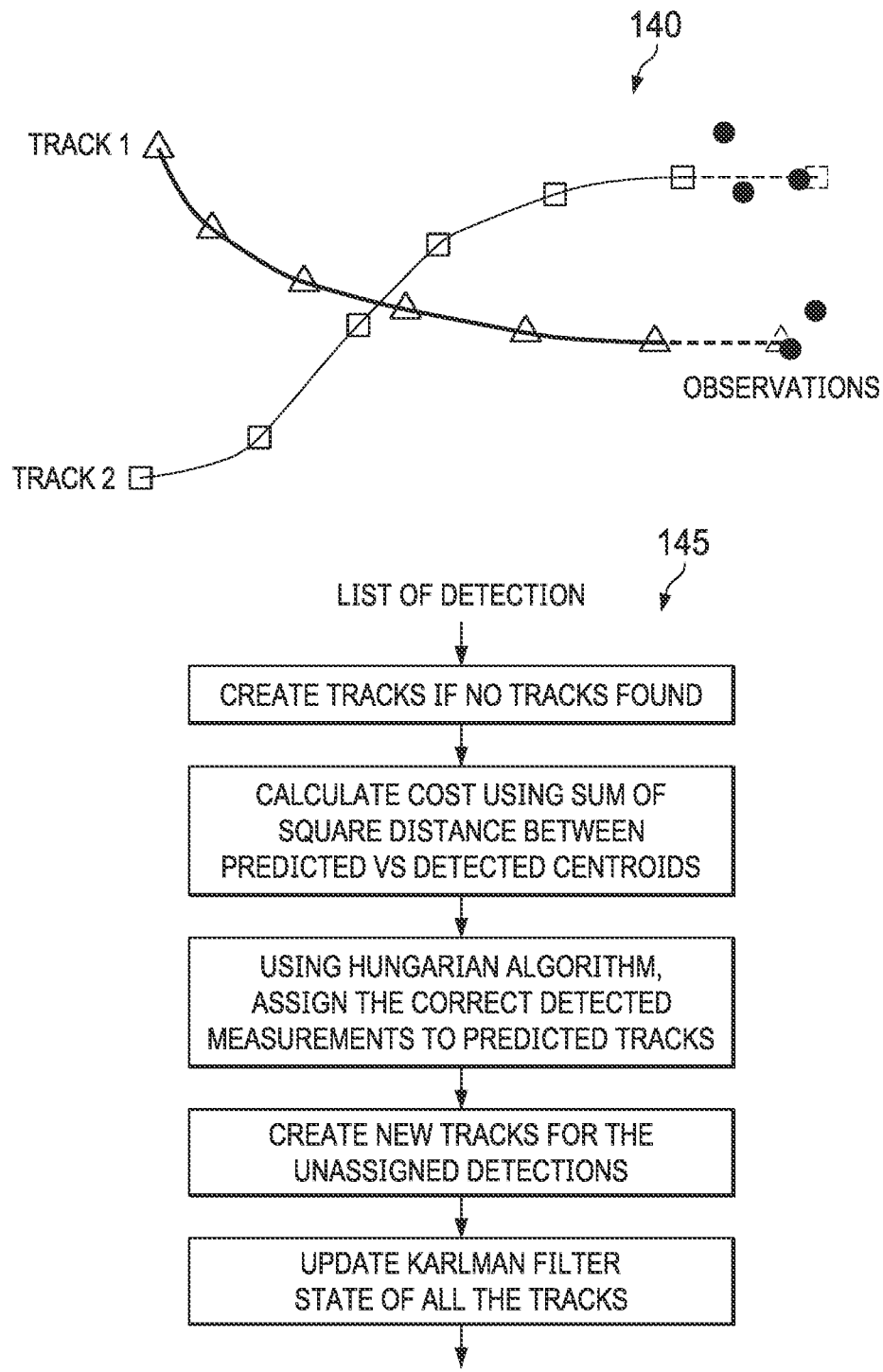
FIG. 14 is a simplified flow diagram illustrating multi-object tracking activities according to some embodiments of the present disclosure.

FIG. 14 is a simplified graphical diagram 140 illustrating multi-object tracking activities. A flow 145 is provided to help illustrate how to determine which observations to add to which track. The flow begins when the system creates tracks if no tracks are found. Then, the system can calculate the cost using sum of square distance between predicted versus detected centroids. Next, using a Hungarian Algorithm, the system can assign the correct detected measurements to predicted tracks. The Hungarian method is a combinatorial optimization algorithm that can solve the assignment problem in polynomial time. Returning back to the flow, the system can create new tracks for the unassigned detections and then update a Filter state (e.g., a Kalman Filter state) of all the tracks.

Figure 15:
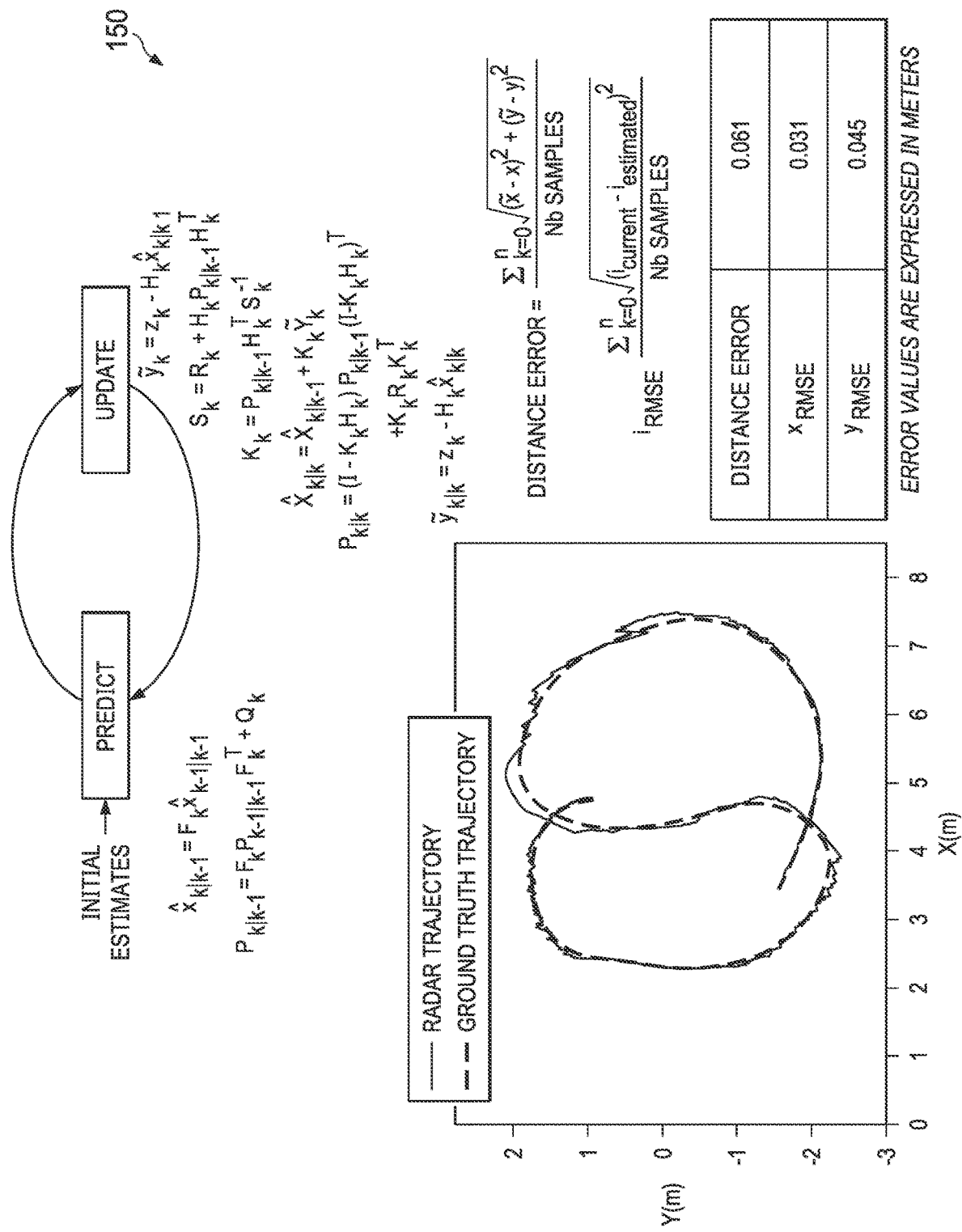
FIG. 15 is a simplified block diagram illustrating a Filter according to some embodiments of the present disclosure.

FIG. 15 is a simplified block diagram illustrating a Kalman Filter 150 in one example implementation. In this case, the diagram depicts the initial estimates of the predict element, along with several equations that can be used to circularly update certain elements. Also provided in this illustration is the radar trajectory and the ground truth trajectory. The distance error can be suitably calculated, which implicates the Nb samples involved for a given case.

Figure 16:
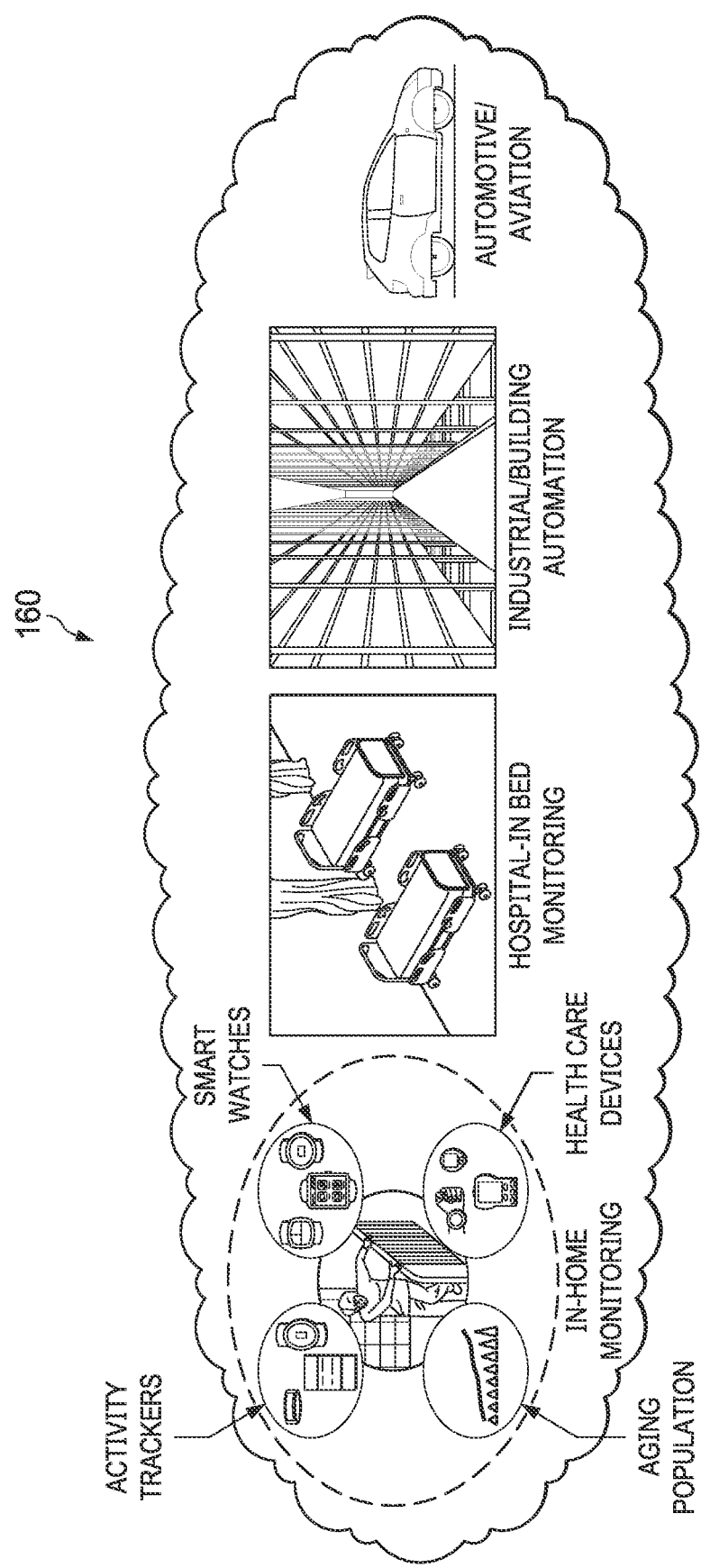
FIG. 16 is a simplified block diagram illustrating several potential applications for teachings of the present disclosure.

FIG. 16 is a simplified block diagram illustrating several potential applications 160 for teachings of the present disclosure. For example, the systems disclosed herein can be used applications such as in automotive for vital signs monitoring (e.g. wheels, or different parts in the engine), in tracking/detecting people in factories, hospital in-bed patient monitoring, animal monitoring, in aviation for pilot monitoring, prison monitoring, gaming, human factors and behavior science, via understanding of human normal gross motor activities and those affected by medications or a physically impairing illness. Companies that sell services to hospitals for home services for discharged patients (e.g., Honeywell) could easily adopt the solutions described herein.

Furthermore, companies that sell directly to consumers at home, to family members for their elderly (ecaring, greatcall aqu. by BestBuy, etc.) could readily use the architectures discussed herein. Additionally, partners that have the capability to install systems (e.g., security companies like ADT), could use any of the systems disclosed herein. Other potential applications include Smart Building (Hive Home), Home-hospitals (such as those provided by Philips, G E), Amazon Warehouses, A R M processor applications, etc.

In general terms, each of the camera units and radar sources (or more generally the monitoring units described) can be capable of transmitting and receiving radio signals of any kind. In some embodiments, each of them can be used to initiate a communication or receive a communication, such as a wireless sensor, a handset, a smart home system device, a computer, a personal digital assistant (PDA), a laptop or electronic notebook, a cellular telephone, an i-Phone™, i-Pad™, a Google Droid™ phone, an Internet Protocol (IP) phone, or any other device, component, element, or object capable of initiating voice, audio, video, media, or data exchanges within system 10.

In the discussions of the embodiments above, any number of processors, capacitors, clocks, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the amplification functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that the activities discussed above with reference to the FIGURES are applicable to any integrated circuits that involve signal processing, particularly those that can execute specialized software programs, or algorithms, some of which may be associated with processing digitized real-time data. Certain embodiments can relate to multi-DSP signal processing, floating point processing, signal/control processing, fixed-function processing, microcontroller applications, etc.

In certain contexts, and as highlighted above, the features discussed herein can be applicable to medical systems, scientific instrumentation, wireless and wired communications, industrial process control, audio and video equipment, current sensing, instrumentation (which can be highly precise), and other digital-processing-based systems. Moreover, certain embodiments discussed above can be provisioned in digital signal processing technologies for medical imaging, patient monitoring, medical instrumentation, and home healthcare, as detailed extensively herein. This could include applications involving pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc. In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

In some embodiments, one or more of monitoring units 15, 30, 41 may be implemented as a radio access point device that can connect to a wired network using e.g. Bluetooth™, WLAN (e.g. Wi-Fi), IEEE 802.15.4 protocol, 3rd Generation Partnership Project (3GPP) network (e.g. 3G, 4G, Long Term Evolution (LTE), 5G) protocols, non-3GPP network (e.g. WiMAX) protocols, or any other appropriate standard. In some embodiments, one or more of monitoring units 15, 30, 41 may be include software (or reciprocating software) that can coordinate in order to achieve their operations and/or features, as outlined herein. In some embodiments, one or more of these elements may include any suitable algorithms, hardware, software, components, modules, interfaces, or objects that facilitate the operations thereof. This may be inclusive of appropriate algorithms and communication protocols that allow for the effective exchange of data or information.

Example Monitoring Units

While various elements are shown in the FIGURES as separate units, in various embodiments, two or more of any of those monitoring units may be combined. Similarly, in various embodiments, functionality of any of those units may be implemented in further divided units. All such monitoring units may include analog-to-digital converters (ADCs), digital-to-analog converters (DACs), various filters, etc. as is suitable for the application.

Figure 17:
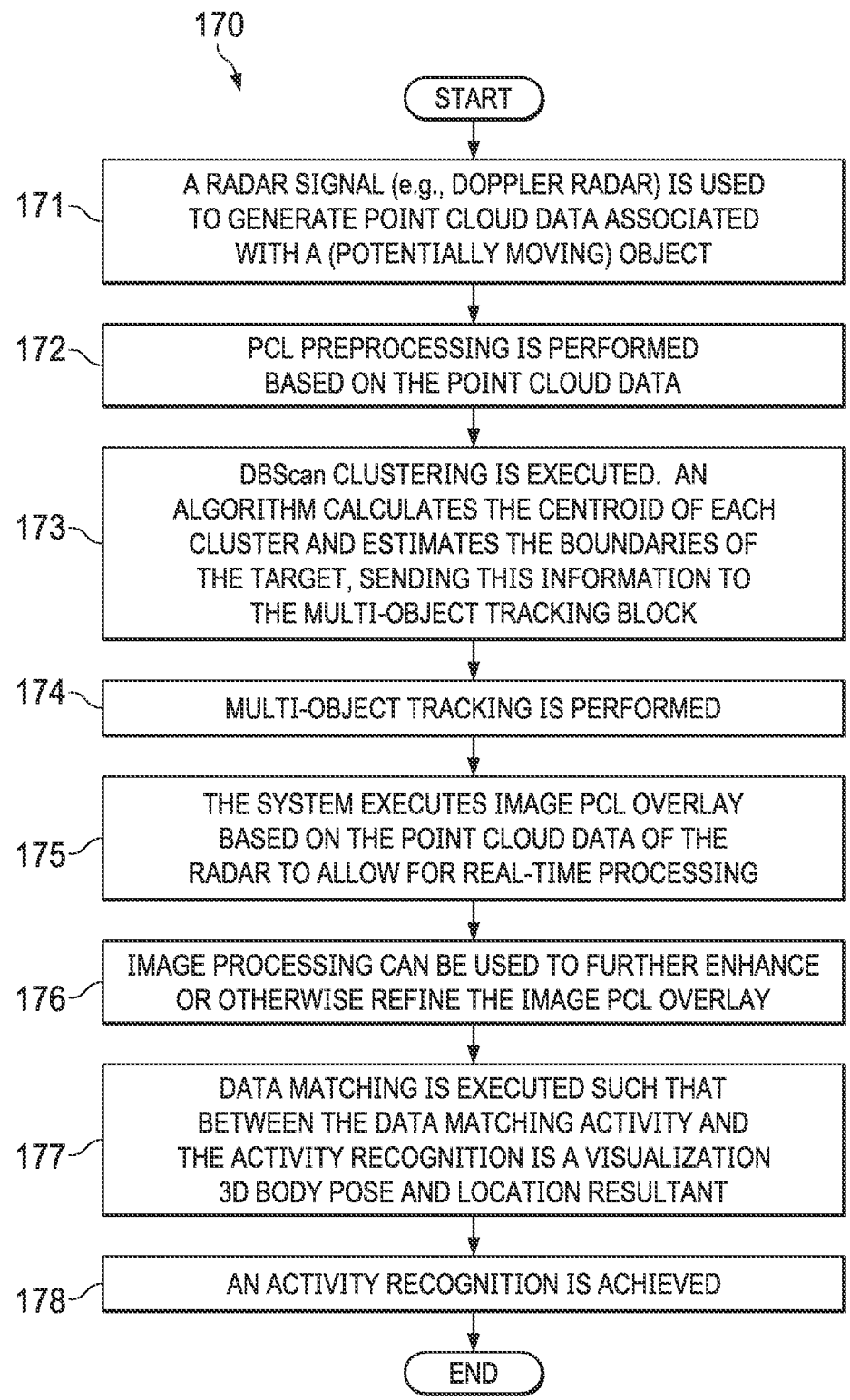
FIG. 17 is a flowchart illustrating an example set of activities according to some embodiments of the present disclosure.

FIG. 17 is a flowchart illustrating an example set of activities 170, according to some embodiments of the present disclosure. In step 171, a radar signal (e.g., Doppler radar) is used to generate point cloud data associated with an object (a potentially moving object). At step 172, PCL preprocessing is performed based on the point cloud data. At step 173, DBSCAN clustering is executed, and subsequently, multi-object tracking is performed at step 174. In one example, an algorithm calculates the centroid of each cluster and estimates the boundaries of the target, sending this information to the multi-object tracking block. At step 175, the system can execute image PCL overlay based on the point cloud data of the radar. This series of steps can provide real-time image data for any selected region. Hence, the system can overlay the cluster onto the image, which allows for real-time processing. At step 176, image processing can be used to further enhance or otherwise refine the image PCL overlay. In step 177, data matching is executed (as detailed above). Between the data matching activity and the activity recognition is a visualization 3D body pose and location resultant. At step 178, an activity recognition is achieved, where this result can be sent along any suitable communication pathway to any suitable subsequent destination. For example, in this case of a fall, the result could be sent over a network to a caregiver, a monitoring company, an emergency service, or a doctor.

Example Data Processing System

Figure 18:
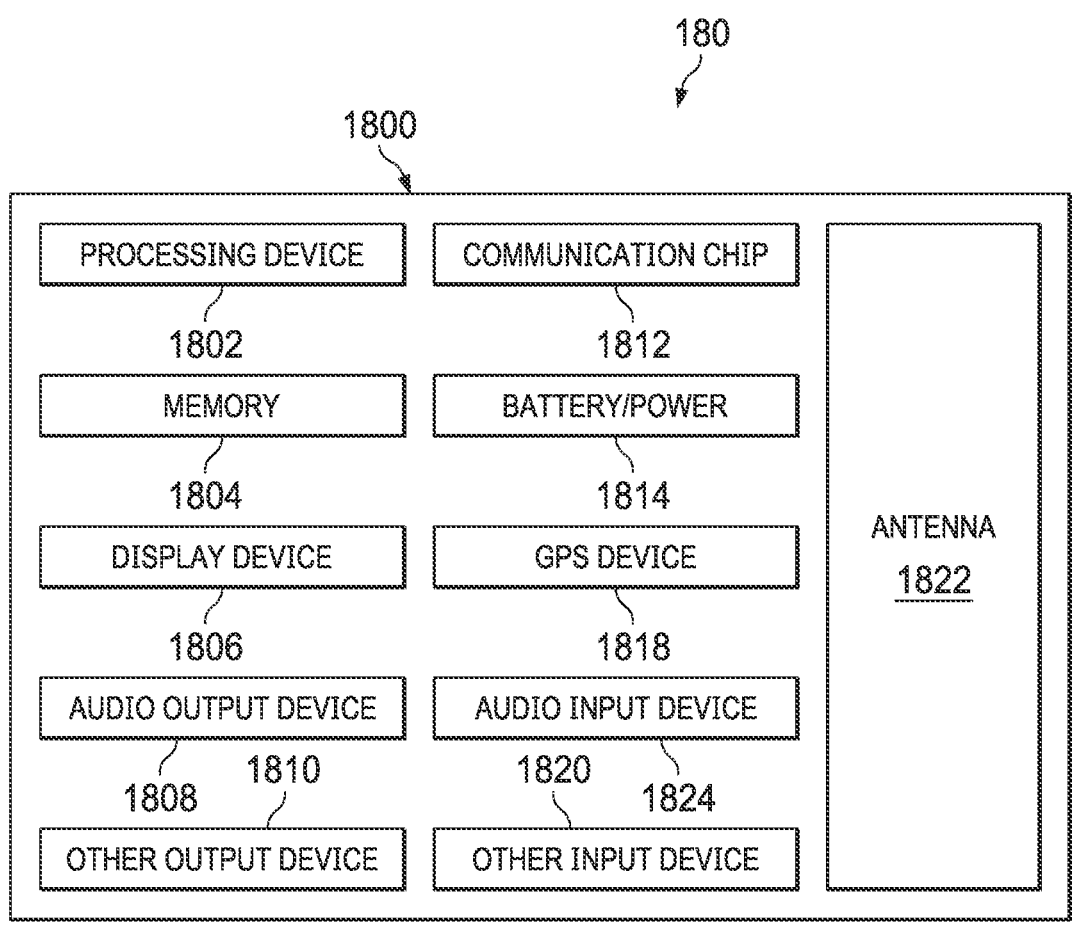
FIG. 18 is a block diagram of an example electrical device in accordance with any of the embodiments disclosed herein.

FIG. 18 is a block diagram of an example electrical device 1800 that may include one or more modules, elements, or objects in accordance with any of the embodiments disclosed herein. It should be noted that electrical device 1800 can be viewed as one possible implementation of any of monitoring units 15, 30, 41. Moreover, any one or more of the software elements of the preceding FIGURES (e.g., in FIGS. 1, 4, 5, 8, 11) can readily be provisioned in electrical device 1800. Such software elements can be combined in countless ways or provisioned as hardware based on particular needs or based on different scenarios. Several components are illustrated in FIG. 18 as included in the electrical device 1800, but any one or more of these components may be omitted or duplicated, as suitable for the application. In some embodiments, some or all the components included in the electrical device 1800 may be attached to one or more motherboards. In some embodiments, some or all these components are fabricated onto a single system-on-a-chip (SoC) die.

Additionally, in various embodiments, the electrical device 1800 may not include one or more of the components illustrated in FIG. 18, but the electrical device 1800 may include interface circuitry for coupling to the one or more components. For example, the electrical device 1800 may not include a display device 1806, but may include display device interface circuitry (e.g., a connector and driver circuitry) to which a display device 1806 may be coupled. In another set of examples, the electrical device 1800 may not include an audio input device 1824 or an audio output device 1808, but may include audio input or output device interface circuitry (e.g., connectors and supporting circuitry) to which an audio input device 1824 or audio output device 1808 may be coupled.

The electrical device 1800 may include a processing device 1802 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices. The electrical device 1800 may include a memory 1804, which may itself include one or more memory devices such as volatile memory (e.g., dynamic random access memory (DRAM)), nonvolatile memory (e.g., read-only memory (ROM)), flash memory, solid state memory, and/or a hard drive. In some embodiments, the memory 1804 may include memory that shares a die with the processing device 1802. This memory may be used as cache memory and may include embedded dynamic random-access memory (eDRAM) or spin transfer torque magnetic random-access memory (STT-MRAM).

In some embodiments, the electrical device 1800 may include a communication chip 1812 (e.g., one or more communication chips). For example, the communication chip 1812 may be configured for managing wireless communications for the transfer of data to and from the electrical device 1800. The term "wireless" and its derivatives may be used to describe circuits, devices, systems, methods, techniques, communications channels, etc., that may communicate data using modulated electromagnetic radiation through a nonsolid medium. The term does not imply that the associated devices do not contain any wires, although in some embodiments they might not.

The communication chip 1812 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra-mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1812 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1812 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1812 may operate in accordance with other wireless protocols in other embodiments. The electrical device 1800 may include an antenna 1822 to facilitate wireless communications and/or to receive other wireless communications (such as AM or FM radio transmissions).

In some embodiments, the communication chip 1812 may manage wired communications, such as electrical, optical, or any other suitable communication protocols (e.g., the Ethernet). As noted above, the communication chip 1812 may include multiple communication chips. For instance, a first communication chip 1812 may be dedicated to shorter-range wireless communications such as Wi-Fi or Bluetooth, and a second communication chip 1812 may be dedicated to longer-range wireless communications such as global positioning system (GPS), EDGE, GPRS, CDMA, WiMAX, LTE, EV-DO, or others. In some embodiments, a first communication chip 1812 may be dedicated to wireless communications, and a second communication chip 1812 may be dedicated to wired communications.

The electrical device 1800 may include battery/power circuitry 1814. The battery/power circuitry 1814 may include one or more energy storage devices (e.g., batteries or capacitors) and/or circuitry for coupling components of the electrical device 1800 to an energy source separate from the electrical device 1800 (e.g., AC line power).

The electrical device 1800 may include a display device 1806 (or corresponding interface circuitry, as discussed above). The display device 1806 may include any visual indicators, such as a heads-up display, a computer monitor, a projector, a touchscreen display, a liquid crystal display (LCD), a light-emitting diode display, or a flat panel display.

The electrical device 1800 may include an audio output device 1808 (or corresponding interface circuitry, as discussed above). The audio output device 1808 may include any device that generates an audible indicator, such as speakers, headsets, or earbuds.

The electrical device 1800 may include an audio input device 1824 (or corresponding interface circuitry, as discussed above). The audio input device 1824 may include any device that generates a signal representative of a sound, such as microphones, microphone arrays, or digital instruments (e.g., instruments having a musical instrument digital interface (MIDI) output).

The electrical device 1800 may include a GPS device 1818 (or corresponding interface circuitry, as discussed above). The GPS device 1818 may be in communication with a satellite-based system and may receive a location of the electrical device 1800, as known in the art.

The electrical device 1800 may include another output device 1810 (or corresponding interface circuitry, as discussed above). Examples of the other output device 1810 may include an audio codec, a video codec, a printer, a wired or wireless transmitter for providing information to other devices, or an additional storage device.

The electrical device 1800 may include another input device 1820 (or corresponding interface circuitry, as discussed above). Examples of the other input device 1820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The electrical device 1800 may have any desired form factor, such as a handheld or mobile electrical device (e.g., a cell phone, a smart phone, a mobile internet device, a music player, a tablet computer, a laptop computer, a netbook computer, an ultrabook computer, a personal digital assistant (PDA), an ultra-mobile personal computer, etc.), a desktop electrical device, a server device or other networked computing component, a printer, a scanner, a monitor, a set-top box, an entertainment control unit, a vehicle control unit, a digital camera, a digital video recorder, or a wearable electrical device. In some embodiments, the electrical device 1800 may be any other electronic device that processes data.

SELECT EXAMPLES

Example 1 Example 1 include an apparatus that is, includes, is part of, or is related to one or more of the embodiments described or discussed above, or some other embodiment of the present disclosure.

Example 2 includes an apparatus comprising means to implement one or more of the embodiments described or discussed above, or some other embodiment of the present disclosure.

Example 3 includes a method for implementing or manufacturing one or more of the embodiments described or discussed above, or some other embodiment of the present disclosure.

Example 4 includes one or more non-transitory computer-readable media comprising instructions that, upon execution of the instructions by an electronic device, are to cause the electronic device to implement or manufacture one or more of the embodiments described or discussed above, or some other embodiment of the present disclosure.

Example 5 is a monitoring unit that includes: a radar source; a camera unit; and one or more processors coupled to the radar element and the camera unit, wherein the monitoring unit is configured to: generate point cloud data associated with an object; execute Point Cloud Library (PCL) preprocessing based, at least, on the point cloud data; execute Density-Based Spatial Clustering of Applications with Noise (DBSCAN) clustering; execute multi-object tracking on the object; execute an image PCL overlay based on the point cloud data to generate real-time data associated with the object.

Example 6 may include the subject matter of Example 1 and further specify that the multi-object tracking includes an algorithm that calculates a centroid of each of a group of clusters and estimates boundaries of the object. Example 7 may include the subject matter of Example 1 and further specify the monitoring unit is further configured to: execute image processing to enhance the image PCL overlay.

Example 8 may include the subject matter of Example 1 and further specify the monitoring unit is configured to: execute data matching and activity recognition to provide a visualization 3D body pose and location resultant associated with the object. Example 9 may include the subject matter of Example 1 and further specify the monitoring unit is configured to: use the point cloud data to output a list of detected elements associated with 3D location, velocity, and amplitude of reflection for the object. Example 10 may include the subject matter of Example 1 and further specify the monitoring unit is further configured to: execute image processing operations to output a list of bounding boxes associated with a label and a score of an activity performed by the object.

Example 11 may include the subject matter of Example 1 and further include a passthrough filter configured to define a region of interest associated with the object and an outlier rejection, which estimates unnatural human motion over a short period of time of the object. Example 12 may include the subject matter of Example 1 and further specify the DBSCAN clustering includes calculating a centroid of each of a group of clusters and estimating one or more boundaries of the object.

Example 13 may include the subject matter of any of Examples 1-12 in a method format. Example 14 may include the subject matter of any of the Examples 1-12 and additionally, be embodied in a software form in which there are one or more computer-readable media having instructions stored thereon, the instructions, when executed by a system, cause the system to perform generate point cloud data associated with an object; execute Point Cloud Library (PCL) preprocessing based, at least, on the point cloud data; execute Density-Based Spatial Clustering of Applications with Noise (DBSCAN) clustering; execute multi-object tracking on the object; and execute an image PCL overlay based on the point cloud data to generate real-time data associated with the object.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made considering the above detailed description or Figures.

In further examples, the non-transitory computer-readable storage medium according to the examples above may further include instructions operable to perform operations performed by the monitoring unit in accordance with any one of examples.

VARIATIONS AND IMPLEMENTATIONS

While embodiments of the present disclosure were described above with references to exemplary implementations as shown in FIGS. 1-18, a person skilled in the art will realize that the various teachings described above are applicable to a large variety of other implementations. In certain contexts, the features discussed herein can be applicable to automotive systems, safety-critical industrial applications, medical systems, scientific instrumentation, wireless and wired communications, radio, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind).

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions.

In the discussions of the embodiments above, components of a system, such as e.g. clocks, multiplexers, buffers, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure related to virtual dithering.

Parts of various systems for implementing the RF ranging using phase difference as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In one example embodiment, any number of electrical circuits of the present FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present FIGS. may be implemented as stand-alone modules (e.g., a device with associated components and circuitry configured to perform a specific application or function) or implemented as plug-in modules into application specific hardware of electronic devices. Note that particular embodiments of the present disclosure implementing the RF ranging using phase difference may be readily included in a system on chip (SOC) package, either in part, or in whole. An SOC represents an integrated circuit (IC) that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package. In various other embodiments, the RF ranging using phase difference proposed herein may be implemented in one or more silicon cores in ASICs, FPGAs, and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the present FIGS. may be combined in various possible configurations, all of which are clearly within the broad scope of the present disclosure. In certain cases, it may be easier to describe one or more of the functionalities of a given set of flows by only referencing a limited number of electrical elements. It should be appreciated that the electrical circuits of the present FIGS. and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in the present disclosure, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to the RF ranging using phase difference as proposed herein illustrate only some of the possible functions that may be executed by, or within, system illustrated in the present FIGS. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Note that all optional features of the apparatus described above may also be implemented with respect to the method or process described herein and specifics in the examples may be used anywhere in one or more embodiments. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

The invention claimed is:

1. A monitoring unit, comprising:
   a radar source;
   a camera unit; and
   one or more processors coupled to the radar source and the camera unit, wherein the monitoring unit is configured to:
      generate point cloud data associated with an object;
      execute Point Cloud Library (PCL) preprocessing based, at least, on the point cloud data;
      execute multi-object tracking on the object;
      execute an image PCL overlay based on the point cloud data to generate real-time data associated with the object; and
      provide a region proposal for a neural network to classify an activity associated with the object.

2. The monitoring unit according to claim 1, wherein the multi-object tracking includes an algorithm that calculates a centroid of each of a group of clusters and estimates boundaries of the object.

3. The monitoring unit according to claim 1, wherein the monitoring unit is further configured to:
   execute image processing to enhance the image PCL overlay.

4. The monitoring unit according to claim 1, wherein the monitoring unit is further configured to:
   execute data matching and activity recognition to provide a visualization 3D body pose and location resultant associated with the object.

5. The monitoring unit according to claim 1, wherein the monitoring unit is further configured to:
   use the point cloud data to output a list of detected elements associated with 3D location, velocity, and amplitude of reflection for the object.

6. The monitoring unit according to claim 1, wherein the monitoring unit is further configured to:
   execute image processing operations to output a list of bounding boxes associated with a label and a score of an activity performed by the object.

7. The monitoring unit according to claim 1, further comprising:
   a passthrough filter configured to define a region of interest associated with the object and an outlier rejection, which estimates unnatural human motion over a short period of time of the object.

8. The monitoring unit according to claim 1, wherein the monitoring unit is further configured to:
   execute Density-Based Spatial Clustering of Applications with Noise (DBSCAN) clustering that includes calculating a centroid of each of a group of clusters and estimating one or more boundaries of the object.

9. A method for monitoring an environment, comprising:
   providing a radar source;
   providing one or more processors coupled to the radar source and a camera unit;
   generating point cloud data associated with an object;
   executing Point Cloud Library (PCL) preprocessing based, at least, on the point cloud data;
   executing multi-object tracking on the object;
   executing an image PCL overlay based on the point cloud data to generate real-time data associated with the object; and
   provide a region proposal for a neural network to classify an activity associated with the object.

10. The method according to claim 9, wherein the multi-object tracking includes an algorithm that calculates a centroid of each of a group of clusters and estimates boundaries of the object.

11. The method according to claim 9, further comprising:
    executing image processing to enhance the image PCL overlay.

12. The method according to claim 9, further comprising:
    executing data matching and activity recognition to provide a visualization 3D body pose and location resultant associated with the object.

13. The method according to claim 9, further comprising:
    using the point cloud data to output a list of detected elements associated with 3D location, velocity, and amplitude of reflection for the object.

14. The method according to claim 9, further comprising:
    executing image processing operations to output a list of bounding boxes associated with a label and a score of an activity performed by the object.

15. The method according to claim 9, further comprising:
    defining a region of interest associated with the object and an outlier rejection, which estimates unnatural human motion over a short period of time of the object.

16. The method according to claim 9, further comprising:
    executing Density-Based Spatial Clustering of Applications with Noise (DBSCAN) clustering that includes calculating a centroid of each of a group of clusters and estimating one or more boundaries of the object.

17. One or more non-transitory computer-readable media having instructions stored thereon, wherein the instructions, when executed by a system, cause the system to:
    generate point cloud data associated with an object;
    execute Point Cloud Library (PCL) preprocessing based, at least, on the point cloud data;
    execute multi-object tracking on the object; execute an image PCL overlay based on the point cloud data to generate real-time data associated with the object; and provide a region proposal for a neural network to classify an activity associated with the object.

18. The one or more non-transitory computer-readable media according to claim 17, wherein the multi-object tracking includes calculating a centroid of each of a group of clusters and estimates boundaries of the object.

19. The one or more non-transitory computer-readable media according to claim 17, wherein the instructions, when executed by a system, cause the system to:
   execute image processing to enhance the image PCL overlay.

20. The one or more non-transitory computer-readable media according to claim 17, wherein the instructions, when executed by a system, cause the system to:
   execute data matching and activity recognition to provide a visualization 3D body pose and location resultant associated with the object.

* * * * *